United States Patent [19]

el Din Nasser

[11] Patent Number: 4,511,436
[45] Date of Patent: Apr. 16, 1985

[54] APPARATUS FOR THE DESALINATION OF SEA WATER

[75] Inventor: Gamal el Din Nasser, Puchheim, Fed. Rep. of Germany

[73] Assignee: D.V.T. Büro für Anwendung Deutscher Verfahrenstechnik H. Morsy, Dusseldorf, Fed. Rep. of Germany

[21] Appl. No.: 496,713

[22] Filed: May 20, 1983

[30] Foreign Application Priority Data

May 24, 1982 [DE] Fed. Rep. of Germany ....... 3219387

[51] Int. Cl.³ .......................... B01D 1/26; B01D 3/02
[52] U.S. Cl. ................................. 202/174; 159/17 R; 159/DIG. 8; 202/236
[58] Field of Search ........................ 202/236, 172–174; 203/71, 72, 89, 10, 11, DIG. 17, DIG. 24; 159/17 R, 17 P, 17 C, 18, DIG. 8

[56] References Cited

U.S. PATENT DOCUMENTS 3,493,040  2/1970  Davidson ............................... 203/89
3,568,462  3/1971  Hoffman et al. ..................... 202/236
3,664,928  5/1972  Roberts ............................... 202/236

*Primary Examiner*—Frank Sever
*Attorney, Agent, or Firm*—Toren, McGeady and Stanger

[57] ABSTRACT

In an apparatus for the desalination of sea water using a multi-effect evaporator process, a sea water preheater and a falling film evaporator are both formed of similar stamped heat exchanger plates. The heat exchanger plates have a uniform arrangement of projections-depressions disposed in a grid-like manner with rows of the projections-depressions extending perpendicularly to one another. The plates are assembled in facing contact so that one pair of plates form tubular ducts and adjacent plates on each side of the pair combine with the plates forming the tubular ducts and provide slot-like ducts separated from and extending perpendicularly to the tubular ducts. Adjacent plates are welded together. The plates in the preheater form a continuous unit divided into stages. The plates in the falling film evaporator are arranged in individual units with each unit forming a separate stage.

12 Claims, 6 Drawing Figures

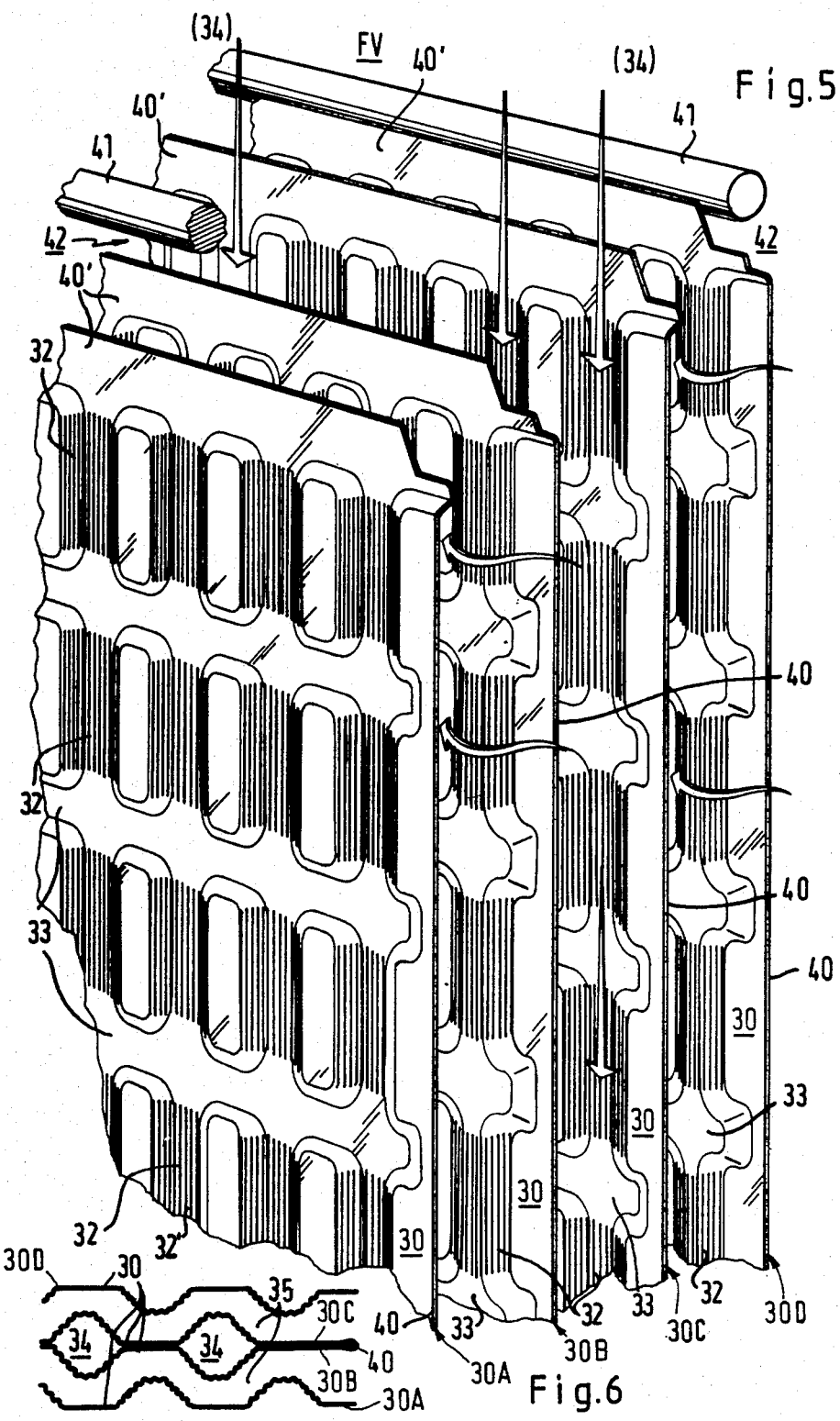

APPARATUS FOR THE DESALINATION OF SEA WATER

SUMMARY OF THE INVENTION

The present invention is directed to an apparatus for desalinating sea water and, in particular, to an apparatus utilizing a multi-effect evaporation process. Such a multi-effect process requires a sea water preheater, and a falling film evaporator, both subdivided into a plurality of sections within vertical columns in accordance with predetermined and selected pressures and temperatures for each section or stage, supply lines for the sea water and for steam used for heating and evaporating sea water, lines for removing the concentrated sea water or brine and the resultant fresh water, and a vacuum system. An example of such a multi-effect evaporation process is disclosed in German Pat. No. 23 34 481.

In such a process, the sea water, heated in the preheater in a number of successive heating stages, is passed successively through the individual stages of the falling film evaporator. The first stage of the falling film evaporator is heated only with primary steam operating at the maximum boiling point determined by the pressure for that stage. In the individual stages of the falling film evaporator a partial evaporation of the sea water takes place, while the remaining liquid component of the sea water flows into the next stage of the falling film evaporator. Downstream of the first stage, the sea water is vaporized using a mixed steam provided by a combination of the primary steam used in the first stage and the steam generated in the evaporation of the sea water. After flowing through the final stage, the sea water is divided into brine and condensed fresh water. Due to the reduction of the boiling point in each successive stage based on the difference in the pressure between the stages, the preheater and the falling film evaporator are subdivided into identical pressure and temperature stages and are arranged as tubular exchangers in the form of vertical columns within a support structure.

Experience has shown that tubular exchangers have an economic length of approximately 7 m, so that the number of stages is limited in the case of a temperature difference of approximately 120° C. available for stage evaporation, whereby even with only 15 stages, the overall height of the column extends for more than 100 m. The efficiency of the multi-effect evaporation process is dependent on the number of evaporation stages which can be obtained within the temperature range between the first and last stages of the evaporator and within the temperature range available for the sea water to be evaporated.

When sea water is desalinated utilizing the multi-effect evaporation gas process, gas residues, particularly inert gases, collect in individual stages of the falling film evaporator and must be removed by suction to avoid any impairment of the condensation process. The removal of the inert gases causes considerable problems in tubular heat exchangers, since, due to the spatial arrangement of the individual tubes and bundles, there is neither a precise condensation end of the stage nor the possibility of an appropriate removal of gases by suction.

It is also difficult when using tubular heat exchangers to distribute uniformly the sea water to be evaporated over the surfaces of the inner walls of the tubes. Only if there is a uniform distribution of the sea water at the start of each stage is there the possibility to obtain the desired homogeneous liquid film covering the inner circumferential surface of the tubes as is necessary for effective evaporation. Such liquid films, however, cannot be maintained over the tube lengths of approximately 7 m.

Finally, considerable difficulties are encountered in the assembly and maintenance of tubular heat exchange columns, because residues are unavoidable in evaporation processes for obtaining fresh water from sea water and, apart from energy costs, the cost balance is largely influenced by maintenance costs.

Therefore, it is the primary object of the present invention to provide a novel apparatus for desalinating sea water using a multi-effect evaporation process where, instead of tubular exchangers, is is possible to increase the efficiency by increasing the number of stages. Further, the construction and arrangement of the required heat exchangers are selected so that the operating costs are considerably reduced both with respect to the energy requirement and the maintenance requirement.

In accordance with the present invention, an apparatus is provided for desalinating sea water utilizing a multi-effect evaporation process which includes the sea water preheater and a falling film evaporator. The preheater and the evaporator are subdivided into a plurality of sections within vertical columns based on predetermined selected pressure and temperature stages. The apparatus includes lines for supplying the sea water and the primary steam, lines for removing the brine and the fresh water, and a vacuum system for the removal of inert gases. Each of the sea water preheater and falling film evaporator are constructed of heat exchanger plates, preferably pressed or stamped from sheet material, having uniformly arranged reinforcing projections which also form depressions on the opposite sides of the plates. The projections-depressions are arranged in a grid-like manner in rows extending transversely of one another. The heat exchanger plates are combined in pairs in side-by-side relation so that the reinforcing projections of a pair of plates combine to form tubular ducts. In addition plates positioned on each side of the plates forming the tubular ducts combine with these plates to form slot-like ducts extending perpendicularly of the axial direction of the tubular ducts. By alternating the arrangement of the plates the tubular ducts are arranged in indirect heat transfer relation with the slot-like ducts extending along each side of the pair of plates forming the tubular ducts.

Further, in accordance with the present invention, an apparatus is provided for desalinating sea water and including a heat exchange assembly made up of an array of similarly formed heat exchanger plates stamped or pressed from sheet material to provide a plurality of projections-depressions in the sheet. The projections-depressions are disposed in a spaced array in substantially parallel rows extending transversely of one another so that the projections-depressions in the respective rows are in alignment and form a corrugated grid-like structure. One pair of the plates are secured together in facing relation and in a mirror image of one another so that the plates form tubular ducts with the edges of the plates extending parallel to the ducts being sealed together. Accordingly, fluid can flow in the axial direction through the tubular ducts. Another plate is secured on each of the opposite sides of the pair of plates forming the tubular ducts in facing relation so that on either side of the plates forming the tubular ducts there are a pair of plates forming slot-like ducts through which a fluid can be passed flowing perpendicularly to the fluid within the tubular ducts.

Preferably, the heat exchanger plates forming the sea water heater are arranged to flow steam through substantially horizontally extending tubular ducts with the sea water passing through vertically extending slot-like ducts. By comparison, the heat exchanger plates forming the falling film evaporator are arranged so that the sea water to be evaporated flows downwardly through substantially vertically extending tubular ducts and the steam for vaporizing the sea water flows through substantially horizontally arranged slot-like ducts. The heat exchanger plates forming the sea water preheater may be provided with opposed substantially flat, that is, unstamped, areas so that such areas are subjected to pressure from water flowing through the slot-like ducts and are urged into contact and effect a subdivision of the tubular ducts of the preheater into separate sections or stages corresponding to the selected number of pressure and temperature stages.

Preferably, the heat exchanger plates which form the falling film evaporator are arranged so that the tubular ducts are vertically aligned and form circumferential surfaces for the film evaporation of the sea water supplied into the ducts. The projections-depressions extending transversely of the projections-depressions forming the tubular ducts provide cross-connections for the tubular ducts for a uniform distribution of the sea water.

It is desirable if the number of heat exchanger plates in the falling film evaporator are varied between the pressure and temperature stages so that by reducing the number of heat exchanger plates and increasing the vertical spacing between the stages, the flow cross-section for the steam is increased in a stepwise manner starting from the inlet stage of the preheated sea water into the falling film evaporator and extending to the final stage of the evaporator. The heating surface for preheating the sea water required for a particular pressure and temperature stage may be determined by selecting the number of pairs of heat exchanger plates forming the tubular ducts associated with that stage.

The slot-like ducts formed by the heat exchanger plates in the falling film evaporator can be interconnected by providing an unstamped zone, preferably located in the center of the plates between the ends of the slot-like ducts with the zone arranged so that noncondensable inert gas components can be removed from the bottom of the slot-like duct formed between a pair of the heat exchanger plates for a given stage.

The heat exchanger plates in the falling film evaporator can be shaped to provide upwardly directed inlets for flowing the sea water to be evaporated into the tubular ducts. Rods may be located within these inlets so they act as flow distributors for the liquid component of the sea water. Preferably, a heat exchanger is provided for condensing steam collected from the final stage of the falling film evaporator.

In accordance with the present invention, by using stamped heat exchanger plates provided with reinforcing projections-depressions disposed in a corrugated grid-like manner in both the sea water preheater and the falling film evaporator, with steam and sea water being supplied to the heat exchanger plates, leads to a number of advantages. For example, the heat exchanger plates making up the sea water preheater are provided with opposed flat or unstamped areas which are responsive to the water pressure in the slot-like ducts so that such areas contact one another and subdivide the tubular ducts of the preheater into closed sections or stages thereby providing a very simple and convenient means for achieving the required number of stages for the available temperature range.

Preferably, each stage of the sea water preheater is associated with a corresponding stage of the falling film evaporator which is also constructed of a group of similarly stamped heat exchanger plates. The vertically extending projections-depressions of the heat exchanger plates in each stage of the falling film evaporator form the tubular surfaces for the film evaporation of the preheated sea water. Preferably the tubular surfaces extend circumferentially. The horizontally arranged reinforcing projections-depressions of the heat exchanger plates provide cross-connections between the tubular ducts. As a result of this arrangement, the sea water introduced into the tubular ducts will, after passage through the tubular ducts of the heat exchanger plates in one stage, be redistributed to the tubular ducts in the next following stage. In this arrangement, the length of the vertically extending projections-depressions can be made relatively small, for example 35 mm, so that it is ensured in each stage where two oppositely directed projections-depressions in a pair of heat exchanger plates form a tubular surface, the surface can carry an uninterrupted homogeneous liquid film which lends itself to efficient liquid evaporation in each stage. As the heat exchanger plates for the sea water preheater and the falling film evaporator preferably have the same stamping or pressing configuration, it is possible to adapt, in an optimum and extremely simple manner the heating surfaces required per stage and also the cross-sections required in each stage for supplying the steam in accordance with the particular prevailing pressure and temperature conditions. Moreover, the construction of the falling film evaporator from pairs of heat exchanger plates, makes it possible, by arranging an unstamped area in the center of the plates between the vertically extending edges, to provide a suction point at the bottom of each stage within the condensation zone so that the inert gases which are released in the process can be removed in a simple manner at the lowermost slot-like duct.

Accordingly, the use of heat exchanger plates makes it possible in an extremely simple and commercially reliable manner to optimize the number of stages in the multi-effect evaporation process with respect to the available temperature range while providing a modular construction for each stage of the sea water preheater and the falling film evaporator. The dimensions of the individual modules can be selected so that easily handled and manintained heat exchanger units are formed whereby, apart from a considerable reduction of the energy requirement for the evaporation process, it is possible to effect a significant reduction in the assembly and maintenance costs.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing

FIG. 5 is a perspective view of a part of a heat exchanger assembly usable in the preheater and falling film evaporator with the plates in the assembly being shown in an exploded view to facilitate the description; and FIG. 6 is a sectional view through a portion of the plate assemblies shown in FIG. 5 illustrating tubular ducts and slot-like ducts formed between the plates.

DETAIL DESCRIPTION OF THE INVENTION

Figure 1:
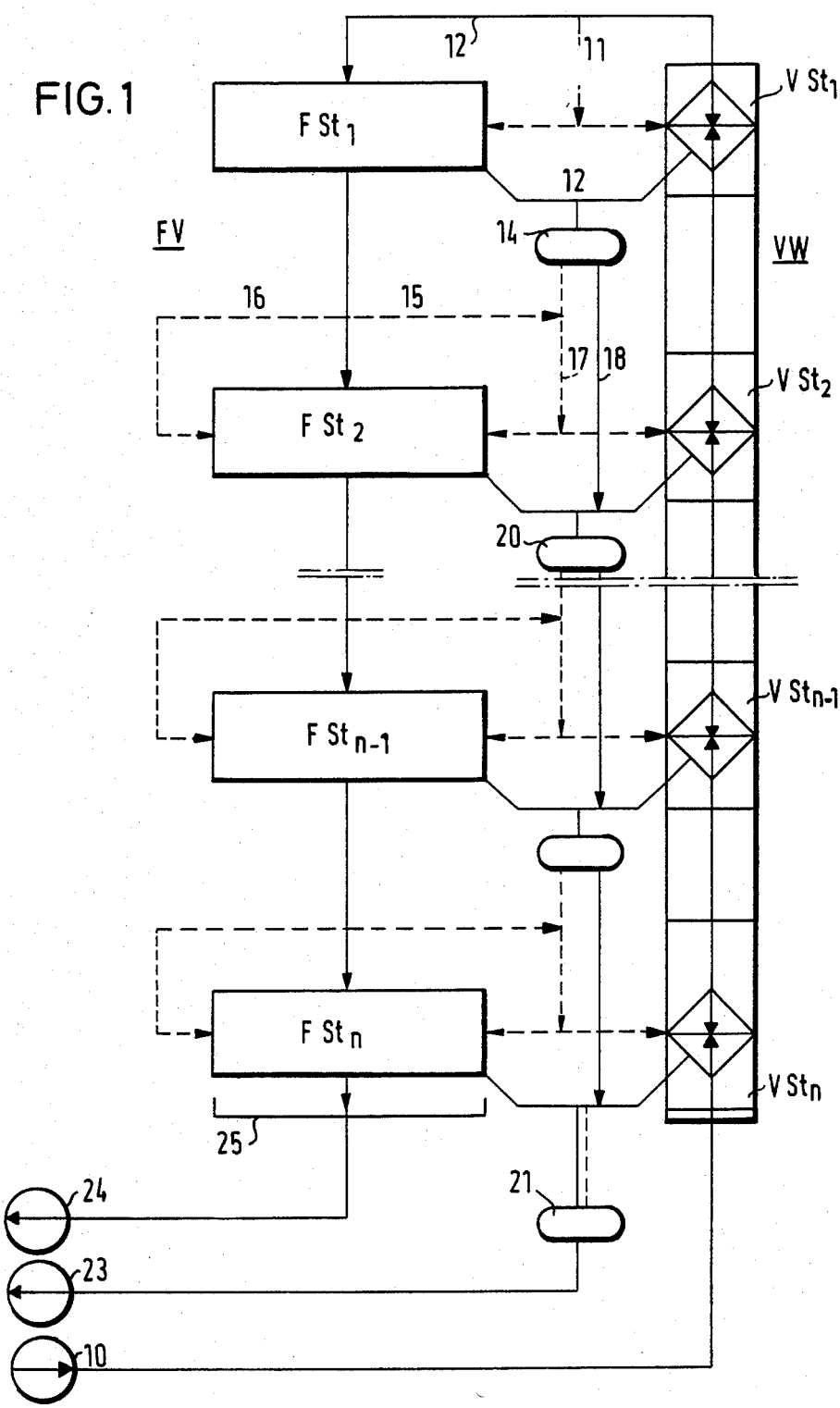
FIG. 1 is a flowchart of a sea water desalination apparatus embodying the present invention.

As illustrated in the flowchart in FIG. 1, cold sea water is introduced by a pump 10 into a preheater VW where it is heated in a number of stages, stages $VSt_n$ to $VSt_1$, by means of condensing steam. The preheated sea water is subsequently evaporated in a multiple stage vertical falling film evaporator FV which is also heated by condensing steam. The falling film evaporator FV is formed of stages $FSt_1$ to $FSt_n$. The first uppermost stage $FSt_1$ is heated with primary steam supplied through a line 11 and this primary steam is also used to heat the uppermost stage $VSt_1$ of the preheater. Initially, the preheated sea water passes via an overflow 12 into the first stage $FSt_1$ of the falling film evaporator FV and then continuously downwardly through the following stages until it has passed through all of the stages $FSt_1$ to $FSt_n$. The steam generated from the sea water in the first stage $FSt_1$ and the steam formed through flash evaporation of the condensate from the first stage at 14, is used to heat the second stage $FSt_2$ of the falling film evaporator and the associated stage $VSt_2$ of the preheater. The mixed steam used in heating the following stages of the falling film evaporator and the preheater is made up of the primary steam and the steam generated from the sea water and the steam flashed in passage through the multiple stage evaporators located between the falling film evaporator and the preheater. The lines 15, 16 and 17 represent the flow between adjacent stages. In this same manner the associated stages of the falling film evaporator and the sea water preheater are interconnected so that the same process is repeated in each of the associated stages. The steam remaining in the final stage $FSt_n$ is condensed in the member 21 and is drawn off by a pump 23 together with the fresh water separated from the sea water during the multi-effect process. As a result, after passing through all of the stages, the fresh water can be removed by the pump 23 and the concentrated liquid component of sea water or brine can be collected in the member 25 below the final stage $FSt_n$ of the falling film evaporator and drawn off by the pump 24. The sea water preheater VW, as shown in FIG. 2, is made up of of identical, pairwise-combined rectangular heat exchanger plates 30, note FIG. 5.

Each heat exchanger plate 30 is a stamped or pressed shaped sheet with uniformly arranged depressions defining on the opposite side of the sheet reinforcing projections 32, 33 which are aligned in rows extending in the longitudinal and transverse direction of the plates. The projections-depressions are arranged in rows extending perpendicularly of one another forming a corrugated grid-like structure. The heat exchanger plates are assembled in pairs with the plates in each pair being mirror images and placed in contact with one another as shown in FIG. 5. In FIGS. 5 and 6, four identical plates 30a, 30b, 30c and 30d are shown with plates 30a, 30b considered as one pair of plates and plates 30c, 30d considered as another pair. Alternatively, plates 30b, 30c may be regarded as one pair while plates 30a, 30d are adjacent plates on the opposite sides of the pair 30b, 30c. In this alternative arrangement the plates 30a, 30d form pairs with the adjacent plates spaced on the opposite sides from the pair of plates 30b, 30c. If it is assumed that the plates 30b, 30c form a pair, they are seam-welded together along the edges 40 extending in the long direction of the projections-depressions 32. As shown in FIG. 6, the projections-depressions 32 in the plates 30B, 30C are in opposed relationship so that the depressions combine to form an array of generally tubular ducts 34 arranged between the plates. The edges 40' of the plates 30A, 30D are welded to adjacent plates 30, not shown, on the opposite side from the pair of plates 30B, 30C. The edges 40' of the plates 30 are bent in the direction away from the plane formed by the axis of the tubular ducts and are welded together, that is, the edges 40' of plates 30A, 30B are welded as are the edges 40' of plates 30C, 30D. The space between the welded edges 40' communicates with the tubular ducts 34 and forms either an inlet 42 into or an outlet from the ducts. Since the edges 40' of plates 30A, 30B and 30C, 30D are seam-welded together, slot-like ducts 35 are defined between the projections-depressions 33 between the plates 30A, 30B and 30C, 30D. By welding alternate edges of the plates, a pack or unit of the heat exchanger plates can be built up to the appropriate thickness so that the plates afford the required surface area for the necessary indirect heat exchange. Accordingly, in such a pack or unit of plates, in one direction there will be formed a plurality of juxtaposed tubular ducts in one direction and a plurality of juxtaposed slot-like ducts 35 in a direction perpendicular to the ducts 34. The heat exchanging media can be passed in cross-flow relation between the different ducts affording the requisite indirect heat transfer. As can be seen in FIGS. 5 and 6 the surfaces of the plates between adjacent projections-depressions 32 define oppositely directed corrugated surfaces 32' for increasing the heat exchange surface area.

Figure 3:
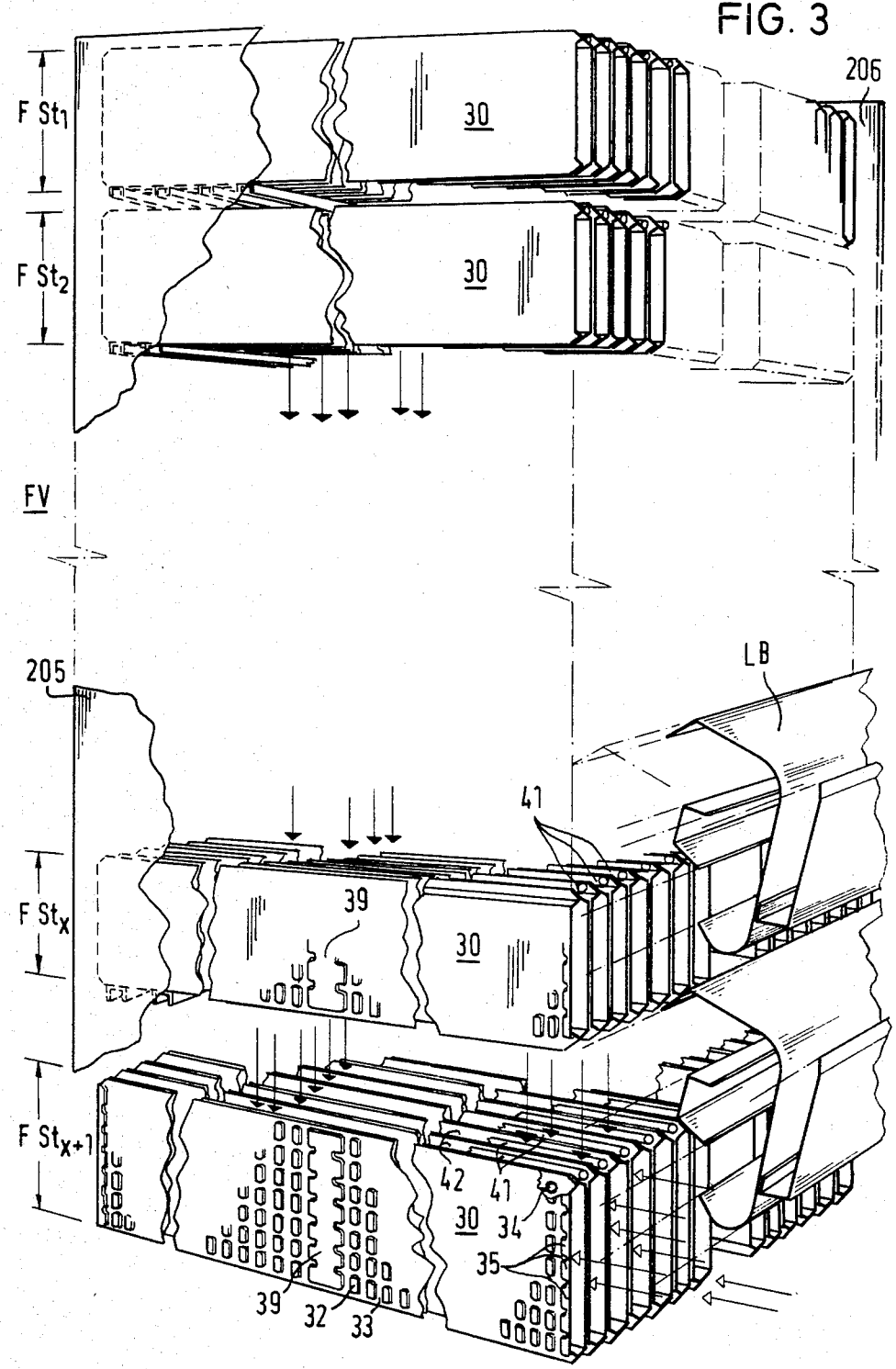
FIG. 3 is a perspective view of a part of a falling film evaporator as shown schematically in FIG. 1.
Figure 4:
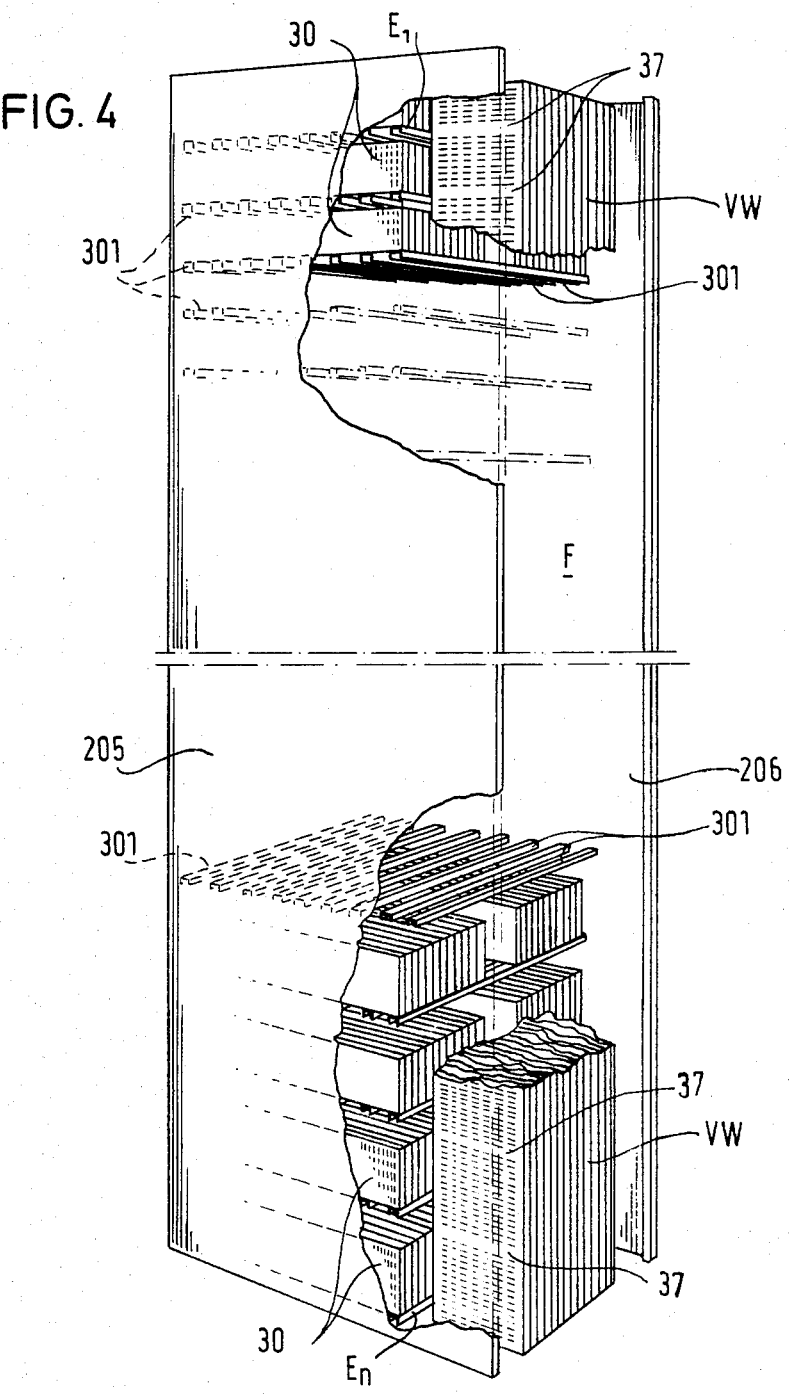
FIG. 4 is a perspective diagrammatic view of the preheater and evaporator shown in FIGS. 2 and 3, illustrating the first several and last several stages of each of the preheater and evaporator.

The arrangement of the heat exchanger plate pairs is mounted as packs or units in a sealed container and are held in position by the container side walls 205, 206, note FIGS. 3 and 4. The container side walls are not shown in detail.

Figure 2:
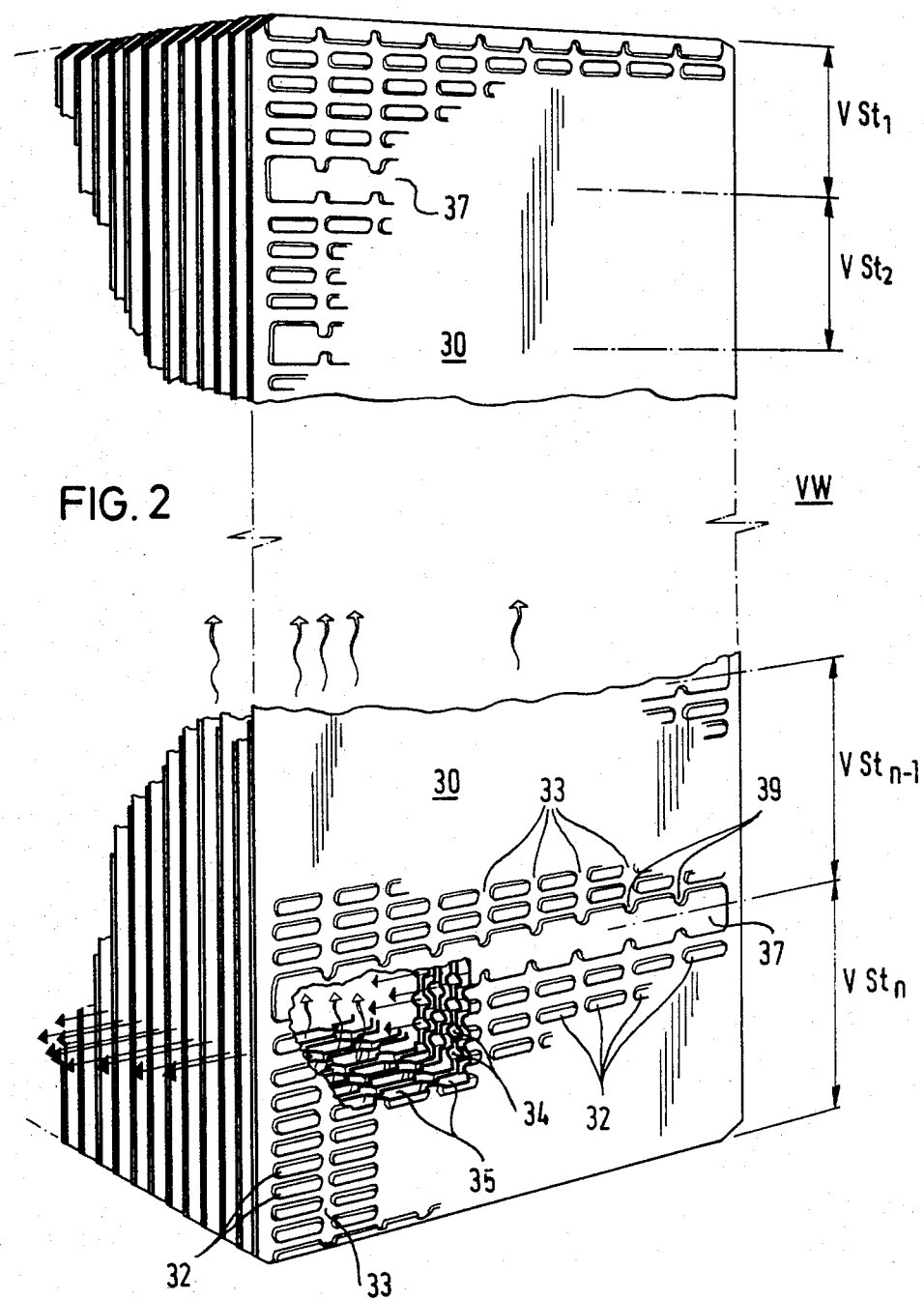
FIG. 2 is a perspective view of a part of a sea water preheater as shown schematically in FIG. 1.

As shown in FIGS. 2 and 4, the sea water preheater VW extends over the entire height of the heat exchanger, and its heat exchanger column and its heat exchanger plates are arranged so that the tubular ducts 34 extend horizontally for carrying the heating steam and the slot-like ducts extend vertically for the upward flow of the sea water. The heat exchanger plates of the preheater are subdivided into sections corresponding to the desired number of stages by providing transversely extending unstamped areas 37 in the individual heat exchanger plates 30. This subdivision of the plates is effected when the unstamped areas of adjacent heat exchanger plates in pairs are pressed against each other by the pressure of the water in the slot-like ducts 35. The total number of tubular ducts in the preheater is subdivided into a plurality of groups each containing several tubular ducts and defining an individual stage of the preheater.

The location of the unstamped areas 37 is determined in accordance with the pressure and temperature stages as predetermined and selected for the multi-effect evaporation process based on the available temperature range. In one embodiment of the invention, 55 stages of the preheater and the falling film evaporator are provided with the vertical spacing between the unstamped areas 37 in the preheater becoming increasingly smaller from stage to stage, starting with the inlet or lowermost stage to the outlet or uppermost stage. Correspondingly, the number of tubular ducts in each stage decreases from the lower end to the upper end of the preheater, note FIG. 4.

The slot width of the slot-like ducts 35 is based on the spacing between the stamped projections-depressions 33, that is on mounting the pairs of heat exchanger plates there are several separate slots in the slot-like ducts. If the stamping action is omitted at a particular location, such as zone 37, a bypass is conveniently provided between the slot-like ducts.

In the preheater VW, the cold sea water is fed into the slot-like ducts in the first, lowermost stage $VSt_n$ and passes upwardly through the various preheater stages to the final top stage $VSt_1$. As the sea water flows upwardly, the heating steam is passed through the tubular ducts 34 extending at right angles to the flow of the water. Hot primary steam provides the only source of heating steam fed into the final, uppermost stage $VSt_1$ while secondary steam, that is a mixture of the primary steam and the steam generated in the various stages of the falling film evaporator VF, is fed through the tubular ducts in all of the other preheater stages. The lowest steam temperature is present in the first stage $VSt_n$ corresponding to the lowest temperature of the sea water in this first stage of the preheater and to the lowest pressure in the sealed container.

The falling film evaporator FV, partly shown in FIG. 3, is made up of individual units or packs of the heat exchanger plates 30 combined in pairs in the same manner as described with reference to FIGS. 5 and 6. Unlike the sea water preheater VW, the units of heat exchanger plates 30 in the evaporator FV are rotated through 90° relative to the plates in the preheater so that the tubular ducts extend vertically and the slot-like ducts extend horizontally.

Consequently, the tubular ducts 34, made up of the individual projections-depressions 32 or the concave surfaces of the depressions, form the evaporation surface for the film evaporation of the sea water passing through the falling film evaporator, and the required steam for heating the sea water to evaporation is supplied through the slot-like ducts 35. The projections-depressions 33, note FIG. 5, form cross-connections or branch channels for the sea water flowing through the tubular ducts 34 and these cross-connections extend substantially across the full width of the plate, that is the horizontal dimension of the plates. Therefore, the liquid component-steam component mixture of the sea water exiting from an individual section of the tubular ducts, that is between a pair of the depressions formed by the projections-depressions 32, is distributed in a uniform fashion to the following tubular ducts as a result of the cross-connections provided by the projections-depressions 33. Thus, the steam pressure within the individual tubular ducts and the differences in the concentration of the salt in the liquid component of the sea water can be equally distributed for further downward flow in the following sections of the tubular ducts in the individual stage.

FIGS. 3 and 4 illustrate the stagewise arrangement of the packs or units of heat exchanger plates 30 of the falling film evaporator FV. While the vertically arranged sea water preheater VW extends over the full height of the column in the closed container and is subdivided into stages by the unstamped areas 37, the falling film evaporator FV is subdivided into a number or array of vertically spaced assemblies or sections, corresponding to the number of stages in the preheater column, and mounted on planes $E_1$ to $E_n$. These spacing or supporting planes have different vertical spacings extending from the lower end to the upper end of the evaporator, that is, the vertical spacing of the individual stages decreases from the lower end to the upper end of the evaporator. The number of the planes $E_1$ to $E_n$ corresponds to the number of stages of the preheater, so that a plane E is associated with each of the pressure and temperature stages $St_1$ to $St_n$ of the multi-effect evaporator process whereby between each of the planes E there is one stage of the preheater and one stage of the falling film evaporator, note FIG. 4. For supporting the exchanger plates 30 of the evaporator FV in an individual stage, a frame structure 301 is fixed to the opposed side walls 205, 206 of the closed structure, see FIG. 4. The frame structure 301 forms the individual support planes $E_1$ to $E_n$ and, as mentioned above, there is a different vertical spacing between the planes which corresponds to the selected number of stages in the preheater column. A film evaporator unit of heat exchanger plates 30 is supported on each of these frame structures 301 as is shown in greater detail in FIG. 3. Deflectors or baffles LB are provided for each stage, note FIG. 3, and though they are not shown in detail, they ensure the flow of the generated steam and fresh water between the individual stages. Further, a suction or vacuum system, now shown, is provided for the removal of non-condensable inert gases obtained in the condensation region 39 in each stage of the falling film evaporator. This condensation region 39 is formed by an unstamped zone in the heat exchanger plates, preferably in the center between the opposite vertical edges of the plates. The condensation region 39 connects all of the slot-like ducts 35 of each plate pair and the inert gas components can be removed at the bottom slot-like duct of the heat exchanger plate pairs in each section or stage of the falling film evaporator.

For uniformly distributing the sea water into the inlets of the individual tubular ducts, rods 41 corresponding to the horizontal dimension of the falling film evaporator plates are located in the upwardly directed channels or inlets 42 formed by the outwardly offset edge regions 40' of a pair of the heat exchanger plates 30. The plates forming the inlets 42 are seam-welded together along their vertically extending edges 40, that is the edges of the plates 30B, 30C in FIG. 5. Each inlet 42 faces toward a superposed stage of the falling film evaporator. The rods 41 serve a dual purpose, one to mix together the possibly different concentration units of the liquid component of the sea water flowing downwardly from the tubular ducts in the superposed stage for effecting a uniform distribution of the brine strength, and also to restrict the flow of the liquid component within the inlets 42 to the downwardly extending tubular ducts forming reservoirs of the liquid component in the inlets 42. These reservoirs act as seals to assist in maintaining the pressure differentials between the various stages of the falling film evaporator.

All of the stages of the sea water preheater and of the falling film evaporator, together with the frame construction carrying these structures are surrounded by the closed pressure container, only partly shown, and secured by a support structure, not shown. A vacuum system, not shown, is connected to the various stages for progressively reducing the pressure as required in the progressive stages to effect the required desalination.

An example of an appropriate container and support structure is disclosed in my co-pending application Ser. No. 496,708, filed 5/20/83.

By way of example, in a practical embodiment of the multi-effect evaporation process for sea water desalination using the above-mentioned stamped heat exchanger plates, the sea water preheater VW and the falling film evaporator FV are each made up of 55 stages, the individual projections-depressions 32 of each heat exchanger plate 30, which afford a reinforcing effect, have a long dimension of 35 mm, and the tubular ducts 34 in the sea water preheater have a length of 350 mm. The slot-like ducts in the falling film evaporator have a length of 2160 mm, the horizontal thickness dimension of a pack or unit of the plates in the falling film evaporator is 500 mm and the height of the column is 34000 mm. The falling film evaporator units, that is one unit for each stage, are formed as slide-in units supported on the frame structures 301. The sea water enters the bottom stage of the sea water preheater at an inlet pressure of approximately 7 bar. Flow through the individual stages of the falling film evaporator takes place under gravity.

The heat exchanger plates 30 forming the sea water preheater are supplied with steam which flows through the tubular ducts 34 while the sea water passes upwardly through the slot-like ducts 35. Within the heat exchanger plates 30 forming the falling film evaporator, the liquid component of the sea water flows downwardly through the tubular ducts 34 while the steam passes in a crossflow arrangement through the slot-like ducts 35.

While specific embodiments of the invention have been shown and described in detail to illustrate the application of the inventive principles, it will be understood that the invention may be embodied otherwise without departing such principles.

I claim:

1. Apparatus for desalinating sea water by a multi-effect evaporation process comprising elements designed, sized and arranged for maximizing efficiency, facilitating removal, of inert gases, maximizing feed distribution and facilitating assembly and maintenance, including a sea water preheater and a falling film evaporator each subdivided into a plurality of sections in accordance with predetermined and selected pressure and temperature stages, each of said sea water preheater and falling film evaporator comprises a plurality of heat exchanger plates with each plate having a pair of oppositely facing sides comprising a first side and a second side and each first and second sides having a first dimension and a second dimension extending perpendicularly of the first dimension, the surfaces of said first and second sides being similarly deformed providing projections on said first and second sides and depressions on the side opposite the projections, said projections-depressions extending in a grid-like arrangement in the direction of the first and second dimensions of said plates with said projections and depressions aligned in rows in the direction of the first and second dimensions, a pair of said plates arranged with the first sides thereof disposed in facing relation with the depressions in the first sides extending in the direction of the first dimension being disposed in opposed alignment and registration and forming tubular ducts extending in the first dimension direction, another said plate placed on each side of said pair of said plates with the second side of the another said plate facing the second side of the adjacent one of said pair of said plates with the projections on said second sides extending in the second dimension direction disposed in opposed alignment, registration and contacting relation for forming therebetween slot-like ducts extending in the direction of the second dimension.

2. Apparatus, as set forth in claim 1, wherein said heat exchanger plates forming said sea water preheater are arranged to be supplied with steam through said tubular ducts arranged substantially horizontally and to be supplied with sea water through said slot-like ducts extending substantially vertically, and said heat exchanger plates forming said falling film evaporator are arranged to be supplied with the liquid sea water component flowing through said tubular ducts disposed substantially vertically and to be supplied with steam for flow through said tube-like ducts extending substantially horizontally.

3. Apparatus, as set forth in claim 2, wherein said heat exchanger plates forming said sea water preheater have opposed substantially flat areas which when subjected to pressure from the sea water flowing through said slot-like ducts causes said flat areas to be urged into abutment for subdividing the tubular ducts of said preheater into groups corresponding to the selected number of pressure and temperature stages of the apparatus.

4. Apparatus, as set forth in claim 2 or 3, wherein said heat exchanger plates forming said falling film evaporator are arranged with the tubular ducts in vertical alignment and forming substantially circumferential surfaces for the film evaporation of the liquid component sea water flowing therethrough, and said projections-depressions extending transversely of said projections-depressions forming said tubular ducts form cross-connections between said tubular ducts for affording a uniform distribution of the sea water flowing through said tubular ducts.

5. Apparatus, as set forth in claim 4, wherein said plates forming said tubular ducts have the edges thereof extending horizontally disposed in spaced relation and forming therebetween inlets into and outlets from said tubular ducts, and the inlets to said tubular ducts are arranged to receive the sea water liquid component flowing downwardly from the superposed stage of said falling film evaporator, and rods positioned in and extending horizontally across the length of said inlets and forming flow distributors for the sea water liquid component into said tubular ducts.

6. Apparatus, as set forth in claim 1, 2 or 3, wherein the number of said heat exchanger plates of said falling film evaporator varies between the pressure and temperature stages so that by reducing the number of said heat exchanger plates and increasing the vertical spacing between said stages, the flow cross-section for steam is increased in a stage-like manner commencing from the inlet stage of the preheated sea water into said falling film evaporator and extending to the final stage of said falling film evaporator.

7. Apparatus, as set forth in claim 1, 2 or 3, wherein the heating surface for preheating the sea water within said preheater required for a particular pressure and temperature stage is determined by selecting the number of pairs of heat exchanger plates forming the tubular ducts associated with said stage.

8. Apparatus, as set forth in claim 2 or 3, wherein said heat exchanger plates forming said falling film evaporator have unstamped regions interconnecting said slot-like ducts and said unstamped regions are arranged so that at least non-condensable inert gas components can be removed from the lower-most slot-like duct of said pairs of heat exchanger plates within one stage of said falling film evaporator.

9. Apparatus, as set forth in claim 1, including a heat exchanger in communication with the final stage of said falling film evaporator for condensing the steam exiting from the final stage.

10. Apparatus, as set forth in claim 1, wherein said heat exchanger plates are one of stamped and pressed for forming said projections-depressions.

11. Apparatus for desalinating sea water comprising elements designed, sized and arranged for maximizing efficiency, facilitating removal of inert gases, maximizing feed distribution and facilitating assembly and maintenance, including a heat exchanger assembly, said heat exchanger assembly comprises an array of similarly formed heat exchanger plates deformed from sheet material for forming a plurality of depressions on one sides of said plates and corresponding projections on the other sides of said plates, said projections-depressions are arranged in a grid-like manner in substantially parallel first rows and parallel second rows extending transversely of said first rows with said projections-depressions in said first and second rows disposed in alignment forming a corrugated grid-like structure, a pair of said plates are secured together in adjacent facing relationship and forming a mirror image of one another sealed along side edges of said plates for providing tubular ducts between said pair of plates so that fluid can flow in the direction of said ducts, another said plate secured to one plate of said pair in adjacent facing relation and forming a mirror image of the one plate of said pair, and the another plate and said one plate being sealed along edges extending transversely of the sealed edges of said pair of plates, and said another plate and the one plate of said pair of plates combining to form slot-like ducts therebetween through which a fluid can flow transversely of the direction of flow through said tubular ducts.

12. Apparatus, as set forth in claim 1 or 11, wherein said projections-depressions are corrugated for increasing the surface area of said ducts.

* * * * *